United States Patent
Yazaki et al.

(10) Patent No.: US 12,519,373 B2
(45) Date of Patent: Jan. 6, 2026

(54) COMBINED POWER SYSTEM

(71) Applicant: HONDA MOTOR CO., LTD., Tokyo (JP)

(72) Inventors: Manabu Yazaki, Wako (JP); Daijiro Eto, Wako (JP); Kenichi Senda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/043,599

(22) Filed: Feb. 3, 2025

(65) Prior Publication Data

US 2025/0253739 A1 Aug. 7, 2025

(30) Foreign Application Priority Data

Feb. 7, 2024 (JP) .................. 2024-016943

(51) Int. Cl.
| | |
|---|---|
| *H02K 9/193* | (2006.01) |
| *F01D 15/10* | (2006.01) |
| *F01D 19/00* | (2006.01) |
| *H02K 5/136* | (2006.01) |
| *H02K 7/08* | (2006.01) |
| *H02K 7/18* | (2006.01) |
| *H02K 21/14* | (2006.01) |

(52) U.S. Cl.
CPC ............ *H02K 9/193* (2013.01); *F01D 15/10* (2013.01); *F01D 19/00* (2013.01); *H02K 5/136* (2013.01); *H02K 7/083* (2013.01); *H02K 7/1823* (2013.01); *H02K 21/14* (2013.01); *F05D 2220/76* (2013.01); *F05D 2260/85* (2013.01)

(58) Field of Classification Search
CPC ........ H02K 9/193; H02K 5/136; H02K 7/083; H02K 7/1823; H02K 21/14; F01D 15/10; F01D 19/00; F05D 2220/76; F05D 2260/85
See application file for complete search history.

(56) References Cited

U.S. PATENT DOCUMENTS

| | | | |
|---|---|---|---|
| 2022/0320966 A1 | 10/2022 | Yazaki et al. | |
| 2022/0320969 A1 | 10/2022 | Yazaki et al. | |
| 2022/0325664 A1* | 10/2022 | Yazaki | ................. H02K 7/1823 |

FOREIGN PATENT DOCUMENTS

| | | |
|---|---|---|
| JP | 2022-157730 A | 10/2022 |
| JP | 2022-157780 A | 10/2022 |

* cited by examiner

*Primary Examiner* — Joseph Ortega
(74) *Attorney, Agent, or Firm* — Rankin, Hill & Clark LLP (57) ABSTRACT

In a combined power system, a rotating electric machine system includes a rotating electric machine, a rotating electric machine housing, an electric terminal, and an oil auxiliary device group. Bearings support a rotating shaft in the rotating electric machine housing. The oil auxiliary device group supplies lubricating oil to the bearings. The oil auxiliary device group is supported by the rotating electric machine housing and is positioned below the electric terminal.

9 Claims, 4 Drawing Sheets

COMBINED POWER SYSTEM

CROSS-REFERENCE TO RELATED APPLICATIONS

This application is based upon and claims the benefit of priority from Japanese Patent Application No. 2024-016943 filed on Feb. 7, 2024, the contents of which are incorporated herein by reference.

BACKGROUND OF THE INVENTION

Field of the Invention

The present invention relates to a combined power system including a rotating electric machine system and an internal combustion engine.

Description of the Related Art

A combined power system is equipped with a rotating electric machine system and an internal combustion engine. A rotating electric machine of the rotating electric machine system includes a rotor and a stator. The rotor includes a rotating shaft. The internal combustion engine has an output shaft inserted into an engine housing. The output shaft is connected to one end of the rotating shaft in an axial direction. Accordingly, the rotating shaft and the output shaft rotate together integrally. In the engine housing, fuel is burned.

The rotating electric machine system further includes a rotating electric machine housing that accommodates a stator and bearings. The rotating shaft is rotatably supported in the rotating electric machine housing via the bearings. As described in JP 2022-157730 A, a lubricating oil is supplied to the bearings. In the combined power system disclosed in JP 2022-157730 A, the internal combustion engine is a gas turbine engine.

SUMMARY OF THE INVENTION

A combined power system is provided with a plurality of oil auxiliary devices and a plurality of fuel auxiliary devices. The plurality of oil auxiliary devices constitute an oil auxiliary device group for supplying the lubricating oil to the bearings. The plurality of fuel auxiliary devices are devices for supplying the fuel to the internal combustion engine. In the combined power system having such a configuration, when the lubricating oil leaks from the oil auxiliary device group, there is a concern that the electric terminals of the rotating electric machine system may be contaminated with the oil.

The present invention has the object of solving the aforementioned problem.

An aspect of the present disclosure is characterized by a combined power system including a rotating electric machine system and an internal combustion engine. In the combined power system, a rotating shaft of the rotating electric machine system and an output shaft of the internal combustion engine are connected in series and rotate integrally. The rotating electric machine system includes a rotating electric machine provided with a stator and a rotor including the rotating shaft, a rotating electric machine housing configured to accommodate the stator and a bearing and support the rotating shaft via the bearing, an electric terminal electrically connected to the stator, and an oil auxiliary device group including a plurality of oil auxiliary devices configured to supply a lubricating oil to the bearing. The oil auxiliary device group is supported by the rotating electric machine housing and is positioned below the electric terminal.

Even if by any chance the lubricating oil leaks from the oil auxiliary device group, the electric terminal is prevented from coming into contact with the lubricating oil. Therefore, the electric terminal can be prevented from being contaminated with the lubricating oil.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
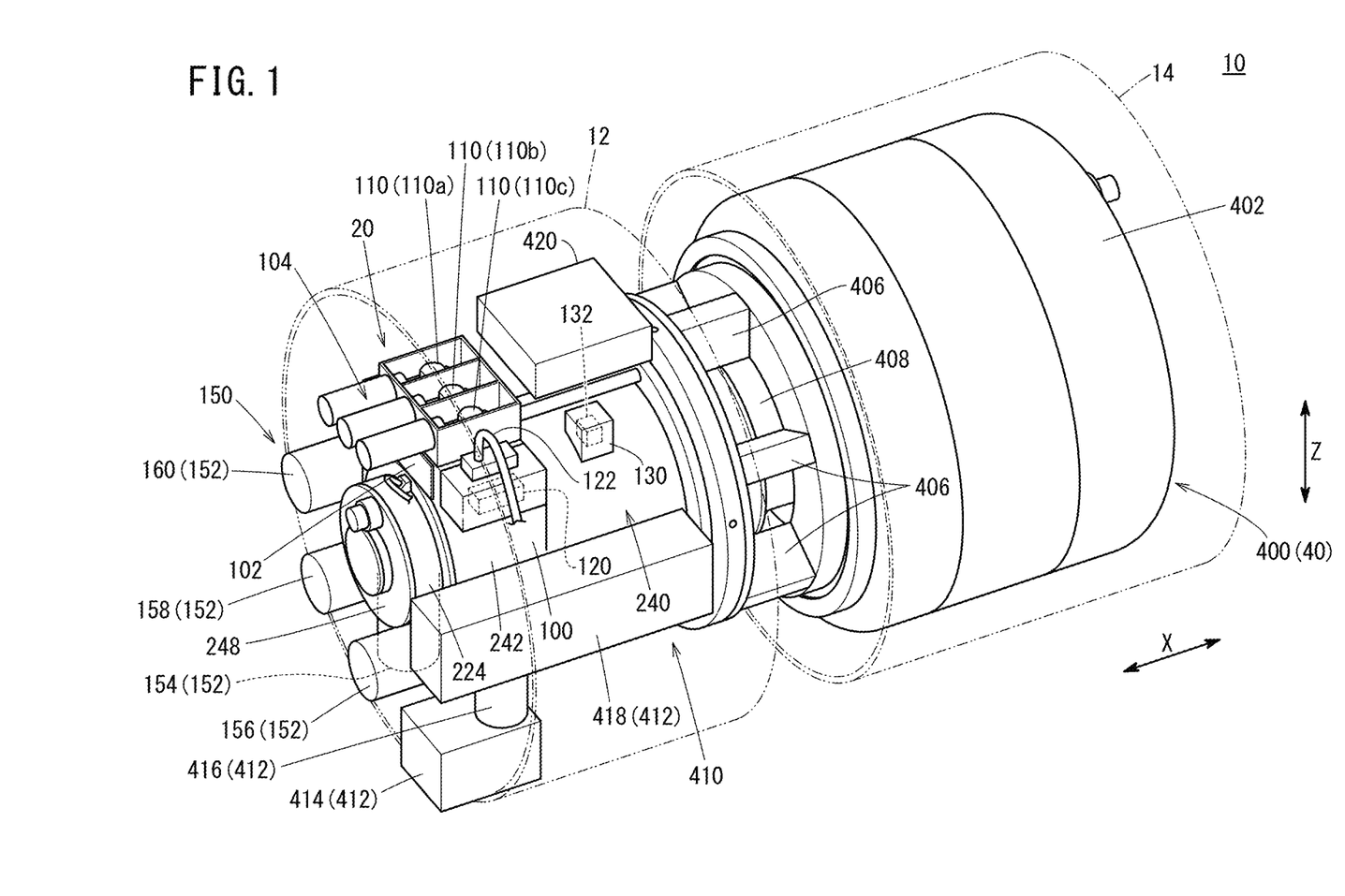
FIG. 1 is a schematic overall perspective view of a combined power system according to an embodiment of the present invention.
Figure 2:
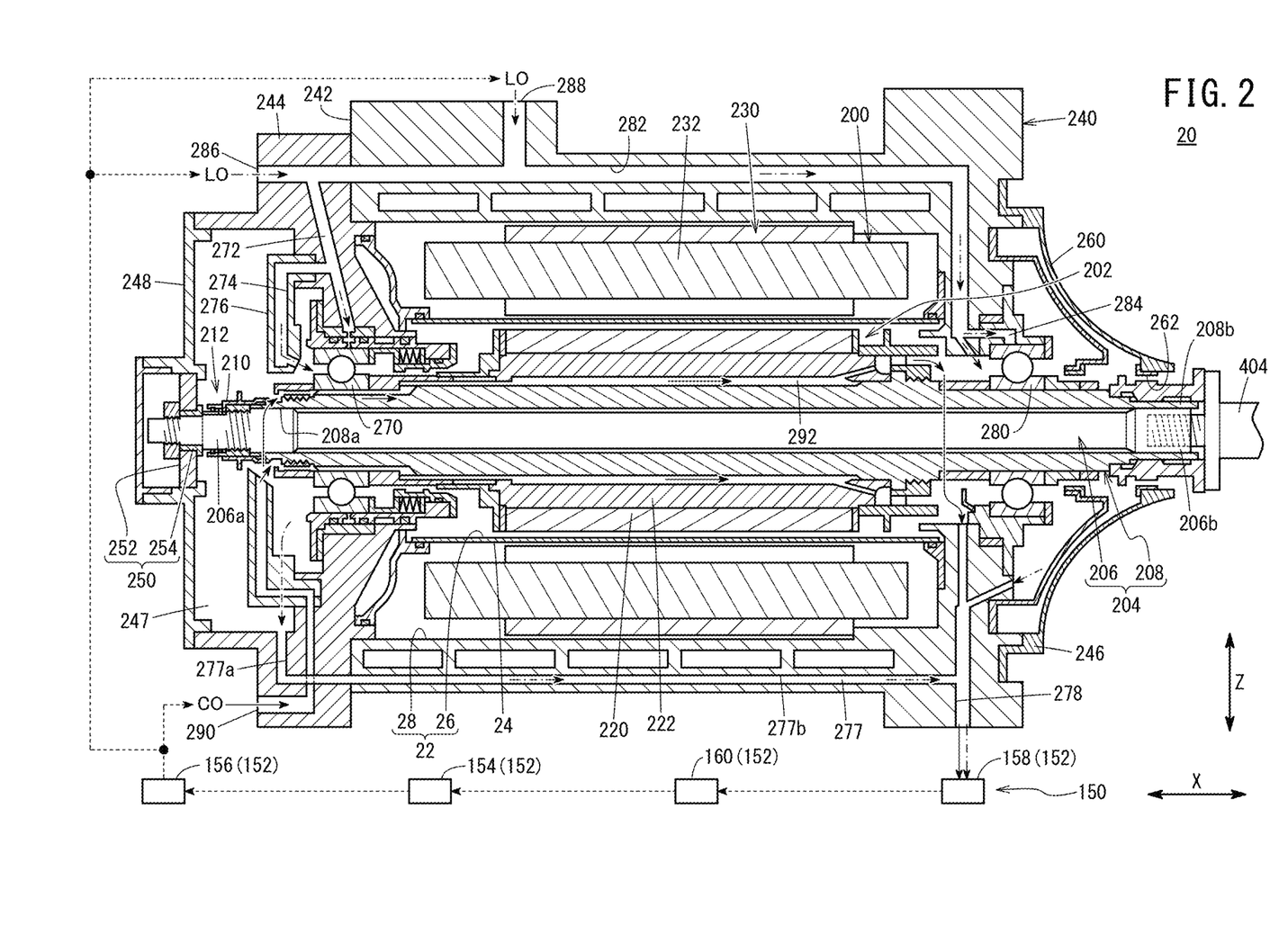
FIG. 2 is a schematic cross-sectional side view when the rotating electric machine system is observed in a direction perpendicular to an axial direction.

In the following description, an "axial direction" is a direction in which a rotating shaft 204 and an output shaft 404 extend. In FIGS. 1 and 2, the axial direction is a direction of an arrow X. FIGS. 1 to 4 show a combined power system 10 in an attitude in which the axial direction extend in the horizontal direction. In the axial direction of a rotating electric machine system 20, an end portion farther from an internal combustion engine 40 may be referred to as a "first end", and an end portion on the side closer to the internal combustion engine 40 may be referred to as a "second end". In the axial direction of the internal combustion engine 40, an end portion closer to the rotating electric machine system 20 may be referred to as a "first end", and an end portion farther from the rotating electric machine system 20 may be referred to as a "second end".

The "up-down direction" is a direction of gravity perpendicular to the axial direction, and is a direction of an arrow Z in FIGS. 1 to 4. The term "above" or "high" means a relatively high position, and is not limited to a directly upper position in the vertical direction. The term "below" or "low" means a relatively low position, and is not limited to a directly lower position in the vertical direction.

FIG. 1 is a schematic overall perspective view of the combined power system 10 according to the present embodiment. The combined power system 10 includes the rotating electric machine system 20 and the internal combustion engine 40. An axis of the rotating electric machine system 20 coincides with an axis of the internal combustion engine 40. Stated otherwise, the rotating electric machine system 20 and the internal combustion engine 40 are arranged on the same axis. In the present embodiment, a gas turbine engine 400 is exemplified as the internal combustion engine 40. However, the internal combustion engine 40 is not limited to the gas turbine engine 400.

The combined power system 10 is used, for example, as a power source for providing propulsion in a flying object, a ship, an automobile, or the like. Suitable specific examples of the flying object include a drone and a multi-copter. The combined power system 10, when mounted on a flying object, is used as a power drive source for rotating, for example, a prop, a ducted fan, or the like. The combined power system 10, when mounted on a ship, is used as a screw rotational force generating device. The combined power system 10, when mounted on an automobile, is used as a power drive source for rotating a motor.

The combined power system 10 can also be used as an auxiliary power source in an aircraft, a ship, a building, or the like. Apart therefrom, it is also possible to utilize the combined power system 10 as gas turbine power generation equipment.

A description will be given concerning the rotating electric machine system 20. As shown in FIG. 2, the rotating electric machine system 20 includes a rotating electric machine 200 and a rotating electric machine housing 240 that accommodates the rotating electric machine 200. The rotating electric machine housing 240 has a main housing 242 that exhibits a substantially cylindrical shape, and includes open opposite ends in the axial direction. The rotating electric machine housing 240 further includes a first sub-housing 244 connected to the first end of the main housing 242 and a second sub-housing 246 connected to the second end of the main housing 242.

The first end of the first sub-housing 244 is an open end and is closed by a resolver holder 248. Being closed by the resolver holder 248, a hollow portion 247 is formed in the interior of the first sub-housing 244. A resolver stator 252 is retained on the resolver holder 248. A resolver rotor 254 disposed on the first end of the rotating shaft 204 and the resolver stator 252 form a resolver 250.

The main housing 242 has an accommodation chamber 22 therein. The accommodation chamber 22 is divided into a rotor chamber 26 and a stator chamber 28 by a partition wall member 24. The rotor chamber 26 is a chamber that is formed on an inner side (an inner peripheral side) in a diametrical direction of the partition wall member 24. The stator chamber 28 is a chamber that is formed on an outer side (an outer peripheral side) in the diametrical direction of the partition wall member 24.

The second sub-housing 246 includes a rectifying member 260 on the second end thereof that faces toward the gas turbine engine 400. The rectifying member 260 is of a substantially truncated conical shape, and reduces in diameter in a tapered shape from the main housing 242 toward the gas turbine engine 400. The rectifying member 260 has an insertion hole 262 at the center in the diametrical direction. The second end of the rotating shaft 204 is passed through the insertion hole 262.

The rotating electric machine 200 includes a rotor 202, and a stator 230 that surrounds an outer periphery of the rotor 202. A major portion of the rotor 202 is accommodated in the rotor chamber 26, and the stator 230 is accommodated in the stator chamber 28.

The rotor 202 is constituted by including the rotating shaft 204, and permanent magnets 220. A sleeve 222 is interposed between the rotating shaft 204 and the permanent magnets 220. The sleeve 222 retains the permanent magnets 220.

The rotating shaft 204 includes an inner shaft 206 and a hollow cylindrical outer shaft 208. The inner shaft 206 is removably inserted in the interior of the outer shaft 208. The inner shaft 206 is longer than the outer shaft 208. A first end portion 206a of the inner shaft 206 is exposed from a first end portion 208a of the outer shaft 208. The first end portion 206a of the inner shaft 206 is connected to the first end portion 208a of the outer shaft 208 by a positioning and fixing member 212 that includes a nut member 210 and the like.

The first end of the output shaft 404 of the gas turbine engine 400 is connected to a second end portion 206b of the inner shaft 206. This feature will be described later.

The first end portion 208a of the outer shaft 208 is rotatably supported by the first sub-housing 244 via a first bearing (bearing) 270. The first sub-housing 244 is formed with a first oil supply passage 272 for supplying lubricating oil LO to the first bearing 270. The first sub-housing 244 further includes a nozzle portion 276 in which a second oil supply passage 274 is formed. The first oil supply passage 272 and the second oil supply passage 274 are flow passages for supplying the lubricating oil LO from an oil supply pump 156 to the first bearing 270.

The first sub-housing 244 and the main housing 242 have a first drain passage 277 for discharging the lubricating oil LO to the outside of the rotating electric machine housing 240. The first drain passage 277 has in the first sub-housing 244, a flow passage 277a extending in the diametrical direction and a flow passage 277b bent in the axial direction with respect to the flow passage 277a. The flow passage 277b of the first drain passage 277 extends in the axial direction in the main housing 242. The first drain passage 277 having the above-described shape merges with a second drain passage 278 extending in the diametrical direction of the main housing 242 at the second end of the main housing 242.

A second end portion 208b of the outer shaft 208 is rotatably retained in the main housing 242 via a second bearing (bearing) 280. The main housing 242 has a third oil supply passage 282 branched from the first oil supply passage 272 therein. The third oil supply passage 282 extends in the axial direction from the first end of the main housing 242 toward the second end thereof, and at the second end, the third oil supply passage 282 extends in the diametrical direction of the main housing 242. A fourth oil supply passage 284 branches off from the third oil supply passage 282. The third oil supply passage 282 and the fourth oil supply passage 284 are flow passages for supplying the lubricating oil LO from the oil supply pump 156 to the second bearing 280.

The second sub-housing 246 has the second drain passage 278 for discharging the lubricating oil LO to the outside of the rotating electric machine housing 240. The second drain passage 278 is a flow passage extending along the diametrical direction of the second sub-housing 246. As described above, the first drain passage 277 joins the second drain passage 278.

The stator 230 includes a plurality of electromagnetic coils 232. The plurality of electromagnetic coils 232 are a U-phase coil, a V-phase coil, and a W-phase coil. In the case that the rotating electric machine 200 is an electrical power generator, the rotating electric machine 200 is a so-called three-phase power source.

As shown in FIG. 1, a first casing 100 and a second casing 102 are integrally provided on the outer peripheral surface in the vicinity of the first end of the main housing 242. That is, the first casing 100 and the second casing 102 are portions of the main housing 242.

The first casing 100 is provided with a socket 104, which is one type of electrical device. The socket 104 includes electric terminals 110. The electric terminals 110 include a U-phase terminal 110a, a V-phase terminal 110b, and a W-phase terminal 110c. The U-phase terminal 110a, the V-phase terminal 110b, and the W-phase terminal 110c are electrically connected to the U-phase coil, the V-phase coil, and the W-phase coil of the electromagnetic coils 232, respectively.

As shown in FIG. 1, a thermistor 120, which is one type of electric device, is accommodated in the second casing 102 adjacent to the first casing 100. A harness 122 that is connected to the thermistor 120 is drawn out from the second casing 102.

A converter box 130 is further provided on the outer peripheral surface of the main housing 242. The converter box 130 is provided at a position slightly closer to the second end than the first casing 100 is. The converter box 130 accommodates a current converter 132, which is one type of electrical device. The current converter 132 includes, for example, a conversion circuit, a capacitor, and a control circuit. The conversion circuit, the capacitor, and the control circuit are not shown.

Figure 3:
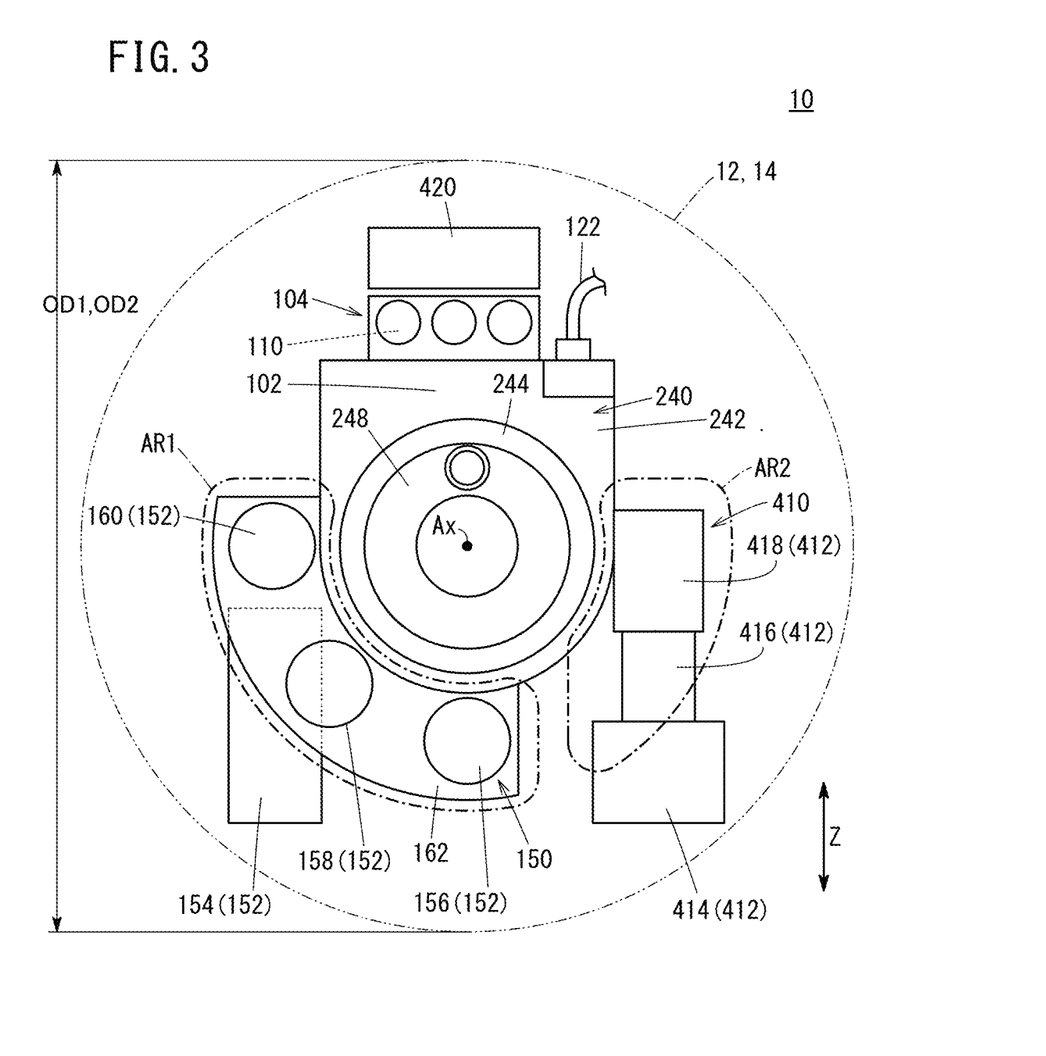
FIG. 3 is a schematic front view when an internal combustion engine is observed from the rotating electric machine system in the axial direction.

The rotating electric machine system 20 includes an oil auxiliary device group 150 shown in FIGS. 2 and 3. In the present embodiment, the oil auxiliary device group 150 includes an oil storage container 154, the oil supply pump 156 (supply pump), a suction pump 158, and a gas-liquid separator 160. Each of the oil storage container 154, the oil supply pump 156, the suction pump 158, and the gas-liquid separator 160 is an oil auxiliary device 152. As described above, the oil auxiliary device group 150 includes the plurality of oil auxiliary devices 152. Although the oil auxiliary device group 150 is schematically shown in FIG. 2, the actual oil auxiliary device group 150 is supported by the rotating electric machine housing 240 via a bracket 162 as shown in FIG. 3.

The oil supply pump 156 supplies the oil stored in the oil storage container 154 to the first oil supply passage 272 and the third oil supply passage 282 through a first oil supply port 286 and a second oil supply port 288, as the lubricating oil LO. In the illustrated example, the oil supply pump 156 can also supply the oil in the oil storage container 154 to a rotor internal flow path 292 formed mainly between the inner shaft 206 and the sleeve 222 through a third oil supply port 290, as a cooling oil CO.

The suction pump 158 suctions the mixed oil (the lubricating oil LO and the cooling oil CO) in the rotating electric machine housing 240, and guides the mixed oil to the gas-liquid separator 160 through the first drain passage 277 and the second drain passage 278. The gas-liquid separator 160 separates a gas phase (gas) from the mixed oil. The gas phase is, for example, compressed air mixed with the lubricating oil LO to form a jet flow of the lubricating oil LO when the lubricating oil LO is supplied to the first bearing 270 and the second bearing 280. The oil storage container 154 stores the mixed oil from which the gas phase has been removed. The mixed oil in the oil storage container 154 is resupplied into the rotating electric machine housing 240 as the lubricating oil LO and the cooling oil CO by the oil supply pump 156. As described above, the lubricating oil LO is supplied to the first bearing 270 and the second bearing 280 in a circulating manner, and the cooling oil CO is supplied to the rotor internal flow path 292 in a circulating manner.

The rotating electric machine system 20 is basically configured as described above. Next, a description will be given concerning the gas turbine engine 400. It should be noted that the configuration of the gas turbine engine 400, for example, is similar to the configuration shown in FIG. 8 of JP 2022-157730 A. Therefore, the description of the gas turbine engine 400 will be kept brief.

As shown in FIG. 1, the gas turbine engine 400 includes an engine housing 402. The engine housing 402 includes a plurality of leg members 406. Air intake spaces 408 are formed between the leg members 406 that are adjacent to each other from among the plurality of leg members 406. A combustor (not shown) is provided inside the engine housing 402.

The gas turbine engine 400 includes the output shaft 404 shown in FIG. 2. The output shaft 404 is inserted into the engine housing 402. The first end of the output shaft 404 is connected in series to the second end of the rotating shaft 204 (the second end portion 206b of the inner shaft 206). A non-illustrated compressor wheel and a non-illustrated turbine wheel are retained by the output shaft 404. The compressor wheel and the turbine wheel are capable of rotating integrally together with the rotating shaft 204 and the output shaft 404.

Figure 4:
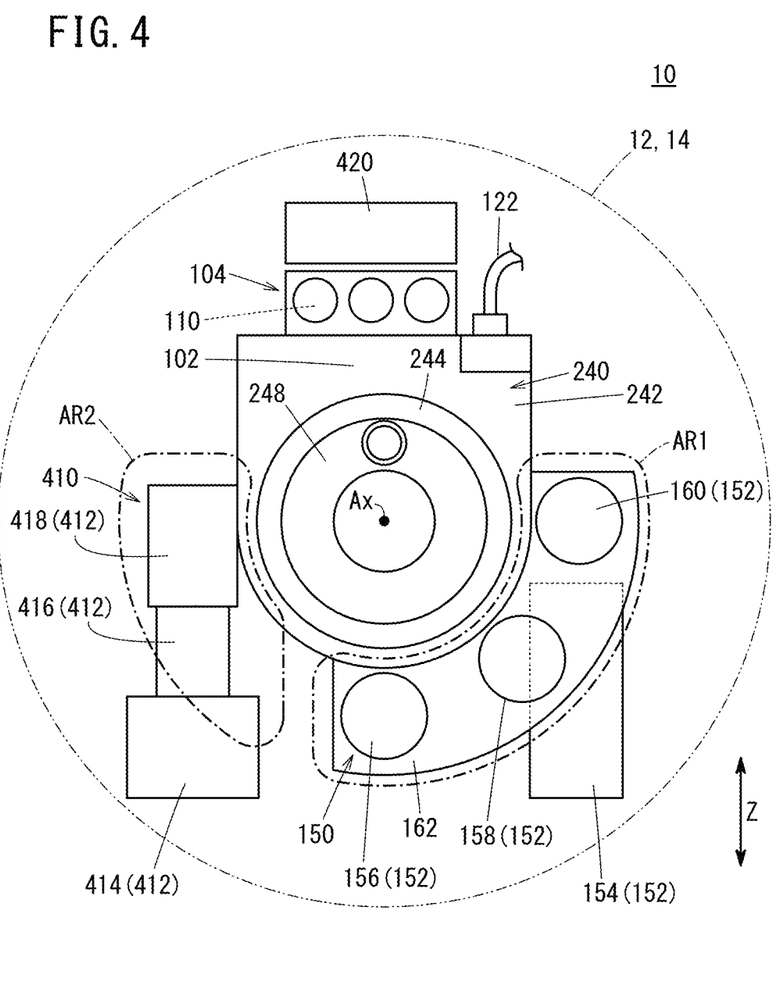
FIG. 4 is a schematic front view illustrating a state in which the positions of an oil auxiliary device group and a fuel auxiliary device group are switched from those shown in FIG. 3.

The gas turbine engine 400 includes a fuel auxiliary device group 410 and an ignition device 420 shown in FIGS. 1, 3 and 4. In the present embodiment, the fuel auxiliary device group 410 includes a fuel storage container 414, a filter 416, and a fuel supply pump 418. Each of the fuel storage container 414, the fuel supply pump 418, and the filter 416 is a fuel auxiliary device 412. As described above, the fuel auxiliary device group 410 includes the plurality of fuel auxiliary devices 412.

The fuel supply pump 418 supplies the fuel stored in the fuel storage container 414 to the combustor in the engine housing 402 through the filter 416. The filter 416 removes foreign substance contained in the fuel.

The ignition device 420 is one type of electric device, and ignites the fuel in the engine housing 402 when the gas turbine engine 400 is to be started. The ignition device 420 is supported by the rotating electric machine housing 240 through a stay (not shown). The ignition device 420 is positioned above the electric terminals 110.

As shown in FIG. 3, when the engine housing 402 is viewed from the rotating electric machine housing 240 in the axial direction, the oil auxiliary device group 150 and the fuel auxiliary device group 410 are arranged in the peripheral direction (circumferential direction). The oil auxiliary device group 150 is disposed in a concentrated manner in a first region AR1 in the peripheral direction. The fuel auxiliary device group 410 is disposed in a concentrated manner in a second region AR2 in the peripheral direction. The second region AR2 is a region that does not overlap the first region AR1 in the peripheral direction. In this way, the oil auxiliary device group 150 and the fuel auxiliary device group 410 are arranged in different regions from each other. As shown in FIG. 4, the position of the oil auxiliary device group 150 (first region AR1) and the position of the fuel auxiliary device group 410 (second region AR2) can be interchanged.

In the above configuration, the socket 104 (the electric terminals 110), the current converter 132, the thermistor 120 and the ignition device 420 are disposed on the upper portion of the rotating electric machine housing 240. The socket 104 (the electric terminals 110), the current converter 132, the thermistor 120, and the ignition device 420 are positioned above the oil auxiliary device group 150 and the fuel auxiliary device group 410. That is, the oil auxiliary device group 150 and the fuel auxiliary device group 410 are disposed below the electric devices.

A central axis Ax shown in FIGS. 3 and 4 is an axis passing through the center of the diametrical direction of the rotating shaft 204 and is also an axis of the rotating electric machine system 20. In the present embodiment, most of the oil auxiliary device group 150 is positioned lower than the central axis Ax. A part of the oil auxiliary device group 150 may be positioned above the central axis Ax. For example, the oil storage container 154, the oil supply pump 156, and the suction pump 158 are positioned below the central axis Ax. The lower portion of the gas-liquid separator 160 is positioned below the central axis Ax, and the upper portion of the gas-liquid separator 160 is positioned above the central axis Ax.

Most of the fuel auxiliary device group 410 is also positioned below the central axis Ax. A part of the fuel auxiliary device group 410 may be positioned above the central axis Ax. For example, the fuel storage container 414 and the filter 416 are positioned below the central axis Ax. The lower portion of the fuel supply pump 418 is positioned below the central axis Ax, and the upper portion of the fuel supply pump 418 is positioned above the central axis Ax.

The combined power system 10 is provided with a first fireproof member 12 and a second fireproof member 14. The first fireproof member 12 covers the outer periphery of the rotating electric machine housing 240. The electric terminals 110, the oil auxiliary device group 150, the fuel auxiliary device group 410, and the ignition device 420 are accommodated in the interior of the first fireproof member 12. The second fireproof member 14 covers the outer periphery of the engine housing 402. An air duct (not shown) is interposed between the second end of the first fireproof member 12 and the first end of the second fireproof member 14.

In the illustrated example, the first fireproof member 12 and the second fireproof member 14 each have a cylindrical shape. As shown in FIG. 3, an outer diameter OD1, which is the outer dimension of the first fireproof member 12 in the up-down direction, and an outer diameter OD2, which is the outer dimension of the second fireproof member 14 in the up-down direction, are substantially equal to each other. It is not essential that the first fireproof member 12 and the second fireproof member 14 are each cylindrical. At least one of the first fireproof member 12 or the second fireproof member 14 may have a semi-cylindrical arch shape. When the first fireproof member 12 or the second fireproof member 14 is not cylindrical, the outer dimensions of the first fireproof member 12 and the second fireproof member 14 are dimensions in the up-down direction.

Next, a description will be given concerning operations of the combined power system 10.

First, an alternating current is supplied to the electromagnetic coils 232 (the U-phase coil, the V-phase coil, and the W-phase coil) via the U-phase terminal 110a, the V-phase terminal 110b, and the W-phase terminal 110c. Accordingly, the rotor 202 starts rotating. Alternatively, the rotor 202 may be rotated by a well-known type of starter (not shown).

Accompanying the rotation of the rotating shaft 204, the output shaft 404 rotates integrally together with the rotating shaft 204. Along therewith, the non-illustrated compressor wheel and the non-illustrated turbine wheel, which are retained on the output shaft 404, rotate integrally together with the output shaft 404. As a result, the atmospheric air is suctioned from the air intake spaces 408 shown in FIG. 1 to the interior of the leg members 406. The atmospheric air is guided into the engine housing 402 by the rectifying member 260 (see FIG. 2) and compressed into compressed air by the compressor wheel.

Furthermore, the fuel stored in the fuel storage container 414 (see FIGS. 1, 3, and 4) is suctioned up by the fuel supply pump 418. After passing through the filter 416, the fuel is sprayed into the combustor within the engine housing 402. In the combustor, a mixture of atomized fuel and compressed air is ignited by the ignition device 420. As a result, combustion is produced in the combustor. Thereafter, the rotation of the output shaft 404 is promoted by the combustion of the fuel. In other words, the output shaft 404 continuously rotates. Accordingly, even if the supply of the electrical current to the electromagnetic coils 232 is stopped, the rotating shaft 204 rotates integrally together with the output shaft 404.

In this way, while the rotating shaft 204 and the output shaft 404 are rotated, the oil supply pump 156 and the suction pump 158 are started. The oil supply pump 156 pumps the oil in the oil storage container 154 toward the first oil supply port 286 and the second oil supply port 288. The oil is supplied to the first oil supply passage 272 and the third oil supply passage 282, respectively, as the lubricating oil LO, through the first oil supply port 286 and the second oil supply port 288. One portion of the lubricating oil LO is discharged from the first oil supply passage 272 and the second oil supply passage 274 toward the first bearing 270 as a jet flow. The lubricating oil LO which has lubricated and cooled the first bearing 270 is suctioned by the suction pump 158, and thereby moves toward the second drain passage 278 via the hollow portion 247 of the first sub-housing 244 and the first drain passage 277.

The remaining portion of the lubricating oil LO is discharged from the third oil supply passage 282 and the fourth oil supply passage 284 toward the second bearing 280 as a jet flow. The lubricating oil LO which has lubricated and cooled the second bearing 280 is suctioned by the suction pump 158, and thereby moves toward the second drain passage 278. The oil supply pump 156 pumps the oil in the oil storage container 154 toward the third oil supply port 290. The oil is supplied to the rotor internal flow path 292 as the cooling oil CO through the third oil supply port 290. The cooling oil CO is mainly cooled the permanent magnets 220 and thereafter is suctioned by the suction pump 158, so that the cooling oil CO moves toward the second drain passage 278.

In the second drain passage 278, the lubricating oil LO that has lubricated and cooled the first bearing 270, the lubricating oil LO that has lubricated and cooled the second bearing 280, and the cooling oil Co that has flowed through the rotor internal flow path 292 join together. The mixed oil of the lubricating oil LO and the cooling oil CO is suctioned by the suction pump 158, discharged to the outside of the rotating electric machine housing 240, and moved to the gas-liquid separator 160. In the gas-liquid separator 160, a gas phase is separated from the mixed oil. The gas phase is discharged to the atmosphere from the gas-liquid separator 160. The mixed oil moves from the gas-liquid separator 160 to the oil storage container 154, and thereafter is suctioned by the oil supply pump 156 and supplied again into the rotating electric machine housing 240 as the lubricating oil LO and the cooling oil Co.

As the rotating shaft 204 rotates, an alternating current is generated in the electromagnetic coils 232 surrounding the permanent magnets 220. The alternating current flows from the U-phase terminal 110a, the V-phase terminal 110b, and the W-phase terminal 110c to the current converter 132, and is converted into a direct current by the current converter 132. The DC current is supplied to an external load such as a battery (not shown).

In the case where the mixed oil leaks from the oil auxiliary device group 150, the mixed oil drips onto the inner surface of the bottom portion of the first fireproof member 12.

The dripped mixed oil is collected on the inner surface of the bottom portion of the first fireproof member 12. In the case where the fuel leaks from the fuel auxiliary device group 410 as well, the fuel is similarly collected on the inner surface of the bottom portion of the first fireproof member 12. This prevents the mixed oil or fuel from flowing out of the first fireproof member 12.

The present embodiment exhibits the following advantageous effects.

As shown in FIGS. 1 to 4, the rotating electric machine system 20 of the combined power system 10 includes the oil auxiliary device group 150 for supplying the lubricating oil LO to the first bearing 270 (see FIG. 2) and the second bearing 280 both supporting the rotating shaft 204. The rotating electric machine system 20 further includes the stator 230 and the electric terminals 110 electrically connected to the stator 230. The oil auxiliary device group 150 is positioned below the electric terminals 110 (see FIGS. 1, 3, and 4).

Even if the lubricating oil LO leaks from any of the plurality of oil auxiliary devices 152 constituting the oil auxiliary device group 150, it is difficult for the lubricating oil LO to rise. Therefore, the electric terminals 110 positioned above the oil auxiliary device group 150 are prevented from coming into contact with the lubricating oil LO. In this configuration, the electric terminals 110 can be prevented from being contaminated with the lubricating oil LO.

The oil auxiliary device group 150 includes the oil storage container 154, the oil supply pump 156, the suction pump 158, and the gas-liquid separator 160. The oil supply pump 156 supplies the oil stored in the oil storage container 154 as the lubricating oil LO into the rotating electric machine housing 240. The suction pump 158 suctions the lubricating oil LO in the rotating electric machine housing 240 and directs the lubricating oil LO to the oil storage container 154 (or collects the lubricating oil LO). The gas-liquid separator 160 separates the gas phase contained in the lubricating oil LO suctioned by the suction pump 158, from the lubricating oil LO.

In the manner described above, the lubricating oil LO can be supplied to the first bearing 270 and the second bearing 280 for lubrication.

As shown in FIGS. 1, 3 and 4, the gas turbine engine 400 includes the fuel auxiliary device group 410 for supplying the fuel to the combustor. The fuel auxiliary device group 410 is located below the electric terminals 110.

Even if the fuel should leak from any of the plurality of fuel auxiliary devices 412, it would be difficult for the fuel to rise. Therefore, the electric terminals 110 positioned above the fuel auxiliary device group 410 are prevented from being contacted by the fuel. In this configuration, the electric terminals 110 can be prevented from being contaminated with the fuel.

The oil auxiliary device group 150 and the fuel auxiliary device group 410 are disposed at a first end that is farther from the gas turbine engine 400 in the axial direction of the rotating shaft 204.

The lubricating oil LO is prevented from being heated to a high temperature by the radiant heat of the gas turbine engine 400. Therefore, for example, the relatively low-temperature lubricating oil LO can be supplied to the first bearing 270 and the second bearing 280. As a result, the first bearing 270 and the second bearing 280 are sufficiently cooled by the lubricating oil LO. Further, since the oil auxiliary device group 150 and the fuel auxiliary device group 410 are concentrated on the first end side of the rotating shaft 204, it is easy to perform maintenance of the oil auxiliary device group 150 and the fuel auxiliary device group 410.

As shown in FIG. 3, the oil auxiliary device group 150 is disposed in the first region AR1 in the peripheral direction of the rotating electric machine housing 240, and the fuel auxiliary device group 410 is disposed in the second region AR2 which does not overlap the first region AR1 in the peripheral direction of the rotating electric machine housing 240.

Since the oil auxiliary device group 150 is concentrated in the first region AR1, it is easy to perform maintenance of the oil auxiliary device group 150. Similarly, since the fuel auxiliary device group 410 is concentrated in the second region AR2, it is easy to perform maintenance of the fuel auxiliary device group 410. Since the oil storage container 154 is positioned in the first region AR1 and the fuel storage container 414 is positioned in the second region AR2, the weights in the peripheral direction of the combined power system 10 are substantially balanced.

As can be understood by comparing FIG. 3 with FIG. 4, the position of the oil auxiliary device group 150 (first region AR1) and the position of the fuel auxiliary device group 410 (second region AR2) can be interchanged with each other.

In accordance with such a configuration, the position of the oil auxiliary device group 150 and the position of the fuel auxiliary device group 410 can be interchanged with each other in accordance with the structure of the equipment on which the combined power system 10 is mounted. Therefore, the degree of freedom in layout of the combined power system 10 in the equipment is improved.

The gas turbine engine 400 includes the ignition device 420. The oil auxiliary device group 150 and the fuel auxiliary device group 410 are positioned below the ignition device 420. In other words, the ignition device 420 is positioned above the oil auxiliary device group 150 and the fuel auxiliary device group 410.

By adopting such a positional relationship, the ignition device 420 is prevented from being contacted by the lubricating oil LO or the fuel.

The combined power system 10 is provided with the first fireproof member 12 which covers the outer periphery of the rotating electric machine housing 240, and the second fireproof member (14) which covers the outer periphery of the engine housing 402. The electric terminals 110, the oil auxiliary device group 150, and the fuel auxiliary device group 410 are accommodated in the interior of the first fireproof member 12.

Even in the case that the lubricating oil LO leaks from the oil auxiliary device group 150, the lubricating oil LO is collected by the first fireproof member 12. In the case where the fuel leaks from the fuel auxiliary device group 410 as well, the fuel is collected by the first fireproof member 12. That is, the lubricating oil LO and the fuel are prevented from leaking from the first fireproof member 12. Therefore, the equipment on which the combined power system 10 is mounted can be prevented from being contaminated with the lubricating oil LO or the fuel.

The outer diameter OD1 (outer dimension in the up-down direction) of the first fireproof member 12 and the outer diameter OD2 (outer dimension in the up-down direction) of the second fireproof member 14 are substantially equal to each other.

In accordance with such a configuration, it is easier to mount the combined power system 10 on the equipment than in the case where the outer dimension of the first fireproof member 12 and the outer dimension of the second fireproof member 14 are greatly different from each other.

The following supplementary notes are further disclosed in relation to the above-described embodiment.

Supplementary Note 1

The combined power system (10) of the present disclosure includes the rotating electric machine system (20) and the internal combustion engine (40). The rotating shaft (204) of the rotating electric machine system and the output shaft (404) of the internal combustion engine are connected in series and rotate integrally. The rotating electric machine system includes the rotating electric machine (200) provided with the stator (230) and the rotor (202) including the rotating shaft, the rotating electric machine housing (240) configured to accommodate the stator and the bearing (270, 280) and support the rotating shaft via the bearing, the electric terminal (110) electrically connected to the stator, and the oil auxiliary device group (150) including the plurality of oil auxiliary devices (152) configured to supply the lubricating oil (LO) to the bearing. The oil auxiliary device group is supported by the rotating electric machine housing and is positioned below the electric terminal.

Even if the lubricating oil should leak from any of the plurality of oil auxiliary devices, the electric terminal is prevented from being contacted by the lubricating oil. Therefore, the electric terminal can be prevented from being contaminated with the lubricating oil.

Supplementary Note 2

In the combined power system according to the supplementary note 1, the oil auxiliary device group may include the oil storage container (154) configured to store the lubricating oil, the supply pump (156) configured to supply the lubricating oil from the oil storage container toward the rotating electric machine housing, the suction pump (158) configured to suction the lubricating oil in the rotating electric machine housing and direct the lubricating oil toward the oil storage container, and the gas-liquid separator (160) configured to separate the gas contained in the lubricating oil suctioned by the suction pump, from the lubricating oil.

In accordance with such a configuration, the lubricating oil can be circulated and supplied to the bearing.

Supplementary Note 3

In the combined power system according to the supplementary note 1, the internal combustion engine may include the fuel auxiliary device group (410) including the plurality of fuel auxiliary devices (412) configured to supply the fuel to the internal combustion engine, and the fuel auxiliary device group may be positioned below the electric terminal.

Even if the fuel should leak from the fuel auxiliary device group, the electric terminal is prevented from being contacted by the fuel. Therefore, the electric terminal can be prevented from being contaminated with the fuel.

Supplementary Note 4

In the combined power system according to the supplementary note 3, the oil auxiliary device group and the fuel auxiliary device group may be disposed at the end portion of the combined power system that is farther from the internal combustion engine in the axial direction of the rotating shaft.

The lubricating oil and the fuel are prevented from being heated to a high temperature by receiving the radiant heat of the internal combustion engine. Therefore, for example, the relatively low-temperature lubricating oil can be supplied to the bearing. As a result, the bearing is sufficiently cooled by the lubricating oil.

Supplementary Note 5

In the combined power system according to the supplementary note 3 or 4, the oil auxiliary device group may be disposed in the first region (AR1) in the peripheral direction of the rotating electric machine housing, and the fuel auxiliary device group may be disposed in the second region (AR2) that does not overlap the first region in the peripheral direction of the rotating electric machine housing.

Since the oil auxiliary device group is concentrated in the first region, it is easy to perform maintenance of the oil auxiliary device group. Similarly, since the fuel auxiliary device group is concentrated in the second region, it is easy to perform maintenance of the fuel auxiliary device group.

Further, since the oil storage container is positioned in the first region and the fuel storage container is positioned in the second region, the weights in the peripheral direction of the combined power system are substantially balanced.

Supplementary Note 6

In the combined power system according to the supplementary note 5, the position of the oil auxiliary device group and the position of the fuel auxiliary device group may be interchangeable.

For example, the position of the oil auxiliary device group and the position of the fuel auxiliary device group can be interchanged with each other in accordance with the structure of the equipment on which the combined power system is mounted. Therefore, the degree of freedom in layout of the combined power system in the equipment is improved.

Supplementary Note 7

In the combined power system according to any one of the supplementary notes 3 to 6, the internal combustion engine may further include the ignition device (420) configured to start the internal combustion engine, and the oil auxiliary device group and the fuel auxiliary device group may be positioned below the ignition device.

The ignition device, which is an electric device, is prevented from coming into contact with the lubricating oil or the fuel.

Supplementary Note 8

The combined power system according to any one of the supplementary notes 1 to 7 may further include the first fireproof member (12) configured to cover the outer periphery of the rotating electric machine housing, and the second fireproof member (14) configured to cover the outer periphery of the engine housing (402) of the internal combustion engine, wherein the electric terminal and the oil auxiliary device group may be accommodated in the interior of the first fireproof member.

Even in the case that the lubricating oil leaks from the oil auxiliary device group, the lubricating oil is collected by the first fireproof member. In the case that the combined power system is equipped with the fuel auxiliary device group, when the fuel leaks from the fuel auxiliary device group as well, the fuel is collected by the first fireproof member. That is, the lubricating oil and the fuel are prevented from leaking from the first fireproof member. Accordingly, the equipment mounted with the combined power system can be prevented from being contaminated with the lubricating oil or the fuel.

Supplementary Note 9

In the combined power system according to the supplementary note 8, the outer dimension of the first fireproof member in the up-down direction with regard to the combined power system may be substantially equal to the outer dimension of the second fireproof member in the up-down direction.

It is easier to mount the combined power system on the equipment than in the case where the outer dimension of the first fireproof member and the outer dimension of the second fireproof member are greatly different from each other.

It should be noted that the present invention is not limited to the disclosure described above, and various additional or alternative configurations could be adopted therein without departing from the essence and gist of the present invention.

The invention claimed is:

1. A combined power system comprising a rotating electric machine system and an internal combustion engine, a rotating shaft of the rotating electric machine system and an output shaft of the internal combustion engine being connected in series and rotating integrally,
wherein the rotating electric machine system comprises:
   a rotating electric machine provided with a stator and a rotor including the rotating shaft;
   a rotating electric machine housing defining a stator chamber in which the stator is accommodated, and accommodating a bearing and supporting the rotating shaft via the bearing;
   an electric terminal electrically connected to the stator; and
   an oil auxiliary device group including a plurality of oil auxiliary devices configured to supply a lubricating oil to the bearing, and
wherein the oil auxiliary device group is supported by the rotating electric machine housing and is positioned below the electric terminal.

2. The combined power system according to claim 1, wherein the oil auxiliary device group includes:
   an oil storage container configured to store the lubricating oil;
   a supply pump configured to supply the lubricating oil from the oil storage container toward the rotating electric machine housing;
   a suction pump configured to suction the lubricating oil in the rotating electric machine housing and direct the lubricating oil toward the oil storage container; and
   a gas-liquid separator configured to separate a gas contained in the lubricating oil suctioned by the suction pump, from the lubricating oil.

3. The combined power system according to claim 1, wherein the internal combustion engine comprises a fuel auxiliary device group including a plurality of fuel auxiliary devices configured to supply a fuel to the internal combustion engine, and
the fuel auxiliary device group is positioned below the electric terminal.

4. The combined power system according to claim 3, wherein the oil auxiliary device group and the fuel auxiliary device group are disposed at an end portion of the combined power system that is farther from the internal combustion engine in an axial direction of the rotating shaft.

5. The combined power system according to claim 4, wherein the oil auxiliary device group is disposed in a first region in a peripheral direction of the rotating electric machine housing, and the fuel auxiliary device group is disposed in a second region that does not overlap the first region in the peripheral direction of the rotating electric machine housing.

6. The combined power system according to claim 5, wherein a position of the oil auxiliary device group and a position of the fuel auxiliary device group are interchangeable.

7. The combined power system according to claim 3, wherein the internal combustion engine further comprises an ignition device configured to start the internal combustion engine, and
the oil auxiliary device group and the fuel auxiliary device group are positioned below the ignition device.

8. The combined power system according to claim 1, further comprising: a first fireproof member configured to cover an outer periphery of the rotating electric machine housing; and
a second fireproof member configured to cover an outer periphery of an engine housing of the internal combustion engine,
wherein the electric terminal and the oil auxiliary device group are accommodated in an interior of the first fireproof member.

9. The combined power system according to claim 8, wherein an outer dimension of the first fireproof member in an up-down direction with regard to the combined power system is substantially equal to an outer dimension of the second fireproof member in the up-down direction.

\* \* \* \* \*